(12) United States Patent
Goldman

(10) Patent No.: US 6,951,455 B2
(45) Date of Patent: Oct. 4, 2005

(54) GAS BURNER

(76) Inventor: Jacob Goldman, 11/6 Dr. Biram St., Haifa (IL) 34986

( * ) Notice: Subject to any disclaimer, the term of this patent is extended or adjusted under 35 U.S.C. 154(b) by 0 days.

(21) Appl. No.: 10/788,222

(22) Filed: Feb. 25, 2004

(65) Prior Publication Data

US 2005/0186522 A1 Aug. 25, 2005

(51) Int. Cl.[7] .............................................. F23N 5/24
(52) U.S. Cl. ...................................... 431/89; 239/602
(58) Field of Search ............................... 431/8, 9, 354, 431/349; 239/602

(56) References Cited

U.S. PATENT DOCUMENTS

| | | | |
|---|---|---|---|
| 3,044,537 A | | 7/1962 | Keating et al. |
| 4,303,386 A | * | 12/1981 | Voorheis et al. ............ 431/177 |
| 4,403,947 A | * | 9/1983 | Spielman .................... 431/353 |
| 5,662,467 A | * | 9/1997 | Jones ........................ 431/175 |
| 5,934,555 A | * | 8/1999 | Dobbeling et al. ........... 239/11 |

FOREIGN PATENT DOCUMENTS

CA        661577         4/1963

OTHER PUBLICATIONS

Eclipse Combustion of Rockford, Illinois, Combustion Products Manual for "Eclipse Tempered Air Burners", 1984.

* cited by examiner

Primary Examiner—Stephen Gravini
(74) Attorney, Agent, or Firm—Cohen, Pontani, Lieberman & Pavane

(57) ABSTRACT

A method and a system for implementing a burner for burning ignitable gas mixed with air for providing heat. Pressurized ignitable gas and forced air are conducted from inside a distribution chamber through minor and major channels running through a burner head of the burner. A mixture of the ignitable gas and the forced air is ignited in at least one of the minor channels, and the ignited mixture is mixed with an inhomogeneous mixture of non-ignited ignitable gas in a flame stabilization chamber of the burner. An air rich mixture is forced in the at least one minor channel wherein at least one spark plug is installed in an extension void associated with an at least one minor channel but remote from the flame stabilization chamber, for igniting the air rich mixture into an ignition flame, which will ignite a flame in the flame stabilization chamber.

15 Claims, 8 Drawing Sheets

GAS BURNER

FIELD OF THE INVENTION

The present invention relates to the field of burners in general, and in particular to gas burners for industrial heating, heat treatment and drying, based on the combustion of gas-air mixtures as a source of energy. The invented burner can be applied to industrial kilns and drying furnaces and other gas fired installations such as bogie hearth, continuous pusher, muffle and rotating furnaces for heating of different materials, heat treatment and drying.

BACKGROUND OF THE INVENTION

Utilization of gas burners in the above-mentioned field is known, for heating and drying purposes. With respect to preparation of the gas-air mixtures, the existing burners can be divided in two categories: premixed and nozzle-mixed types. The premixed technique (see for instance a catalogue of "Buzzer", Charles A. Hones Inc. P.O. Box 510. 607 Albany Ave. NO. Amityville, N.Y. 11701, USA) provides for a high quality combustion, however it requires the use of special devices for flashback flame prevention. Additionally, the technique cannot be used in furnaces using mixtures with high excess of air, or in pressurized furnaces, or in furnaces operating over a wide range of the gas flow.

The nozzle-mixed burners (see for instance an "Eclipse Tempered Air Burners", Rockford, Ill. 61103 (8155) 877-301; U.S. Pat. No. 3,044,537; Canadian Patent 661,577) do not suffer from flash-back flame effects, and are therefore exempt from utilizing non-return valves or other means to prevent flash-back fires. In such burners a combustible gas is made by mixing a hydrocarbon gas with air and igniting the mixture at the exit of the nozzle as soon as practical. The employment of such a technique, allows for an intentional flame temperature reduction by use of either an "on-ratio" mixture (about a stoichiometric gas:air ratio) or an excess of air. However, for this type of operation special care should taken to adapt the burners to the use of different sources of hydrocarbon gases, in order specifically to stabilize the flame and prevent soot formation in case of incomplete combustion. Some modifications of both types of burning techniques are current in the industry. Known in the art are combinations of a plurality of hydrocarbon gas and air nozzles, aimed at restricting the burning area. However, each modification is restrictive with respect to the terms of use, to avoid uncalled for effects.

SUMMARY OF THE INVENTION

The object of the present invention is to provide a gas burner for supplying heat energy in which the above-mentioned disadvantages associated with each of the two types of burning techniques are reduced or altogether eliminated.

In accordance with one object of the present invention a burner is provided that conducts a partially premixed gas, and yet overall, has a good mixing ability. This is advantageous with respect to reducing soot production and reducing tendency for flash-backs. The implementation of the invention thus promotes a more stable flame, as well as allowing for the use of gaseous mixtures with a high excess of air and of pressurized furnace conditions, as well as endurance over a high range of gas flow rates, which is advantageous as regards premixing burners. This object is achieved by applying a method for burning ignitable gas mixed with air for providing heat, comprising the steps of:

feeding pressurized ignitable gas and forced air from inside a distribution chamber into channels of a burner head, conducting the ignitable gas and the air in minor and major channels running through the burner head from a receiving end to a discharge end, igniting a mixture of the ignitable gas and the forced air in at least one of the minor channels, and mixing the ignited mixture with an inhomogeneous mixture of non ignited ignitable gas in a flame stabilization chamber.

Still another object of the present invention is to provide gas burners having a compact flame, by implementing a combination of different channels, whereby each different channel is capable of providing a gas mixture of a different ratio. This structural combination typified by a multi-nozzle gas supplying system with a multi-channel partial mixing allows for a reliable ignition of the flame due to the existence of a gas rich mixture in a portion of the channels, facilitating a stable operation at a wide range of gas flow rates. Such a combination provides for more intensive combustion and for a more restricted zone of flame stabilization, beginning after the ignition point. For such a purpose, a substantially dome shaped flame stabilization chamber is provided at the discharge end of the burner head.

Yet another object of the present invention is a gas burner provided with a high temperature flame core and with a low temperature air mantle for attenuating the overall temperature of the flame and for allowing operation of the burner with a high excess of air, to reduce the temperature of combustion products and of NOx formation, with a concomitant improvement of the completeness of the combustion process.

One more object of the present invention is an electric spark plug assembly for providing ignition in a locally distributed gas-rich mixture, creating free radicals for starting the reactions, remote and far away from the main flame. As the spark plug is charged and a spark is produced, the gas is initiated and ignited in a minor channel and the flame produced is subsequently conducted along the channel to a flame stabilization chamber. Usually, a gas-rich mixture is forced in the at least one minor channel. The activation of the spark plug creates an ignition flame lasting for as long as the spark plug is activated, for ignition of a flame inside the flame stabilization chamber.

It is a further object of the present invention to implement a system for providing heat by burning ignitable gas mixed with air, comprising:

an air distribution chamber into an inside of which a forced air flow is fed, a burner head having a length defined by a first receiving end for accepting forced air and ignitable gas, and by a second discharge end, a gas conduit for delivering ignitable gas into the receiving end of the burner head, major and minor channels running through the length of the burner head, at least one spark plug installed in an extension void associated with at least one minor channel, for igniting the forced air and the ignitable gas, and a flame stabilization chamber associated with a discharge end of the burner head.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

Figure 1:
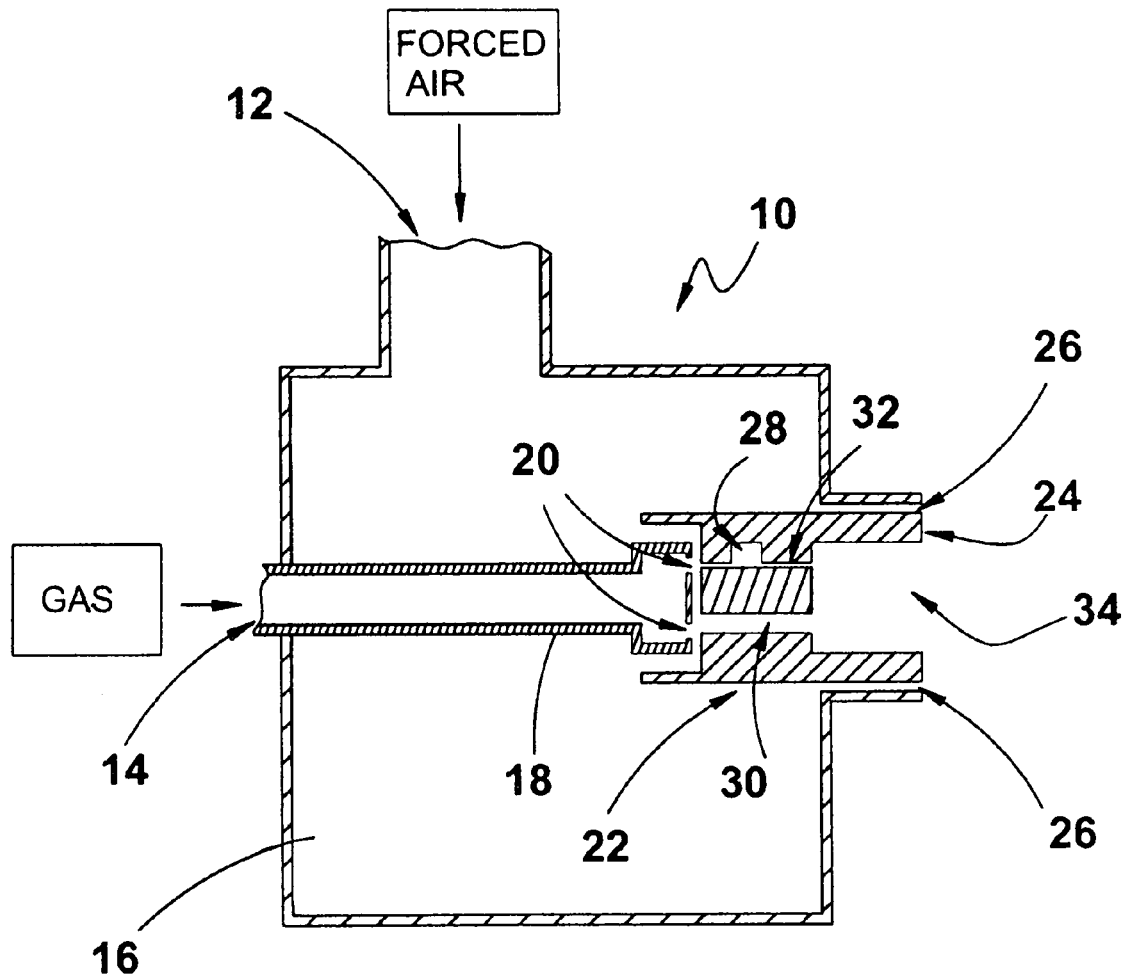
FIG. 1 is a general schematic overview of a gas burner in accordance with the present invention.

The present invention provides a gas burner with some novel properties. Ignitable gas (hereinafter referred to as gas) is mixed with air to form a combustible mixture as will be described in detail hereinafter. Reference is first made to FIG. 1, which schematically depicts a generalized form of a gas burner 10 of the invention. Two supply terminals 12 and 14 are associated with pressurized air inlet and pressurized gas inlet, respectively. Air is fed into the air distribution chamber 16. Gas is fed into an internal gas conduit 18, which terminates in a set of nozzles 20. The receiving end of the burner head 22 accepts gas from conduit 18, which feeds the gas through nozzles 20, and accepts air from the air distribution chamber 16. Combustion gases and heat evolve in the discharge end 24 of the burner head 22. External pressurized air flows through one or more channels 26 in parallel to the air being combusted in the burner head. Channel 26 is typically annular in shape, surrounding the burner head 22 completely.

Burner head 22 further features an extension void 28 for an ignition device, and also, at least one major channel 30 and at least one minor channel 32 extending longitudinally downstream from the receiving end to the discharge end 24 of the burner head 22 to end into a flame stabilization chamber 34.

Figure 2A:
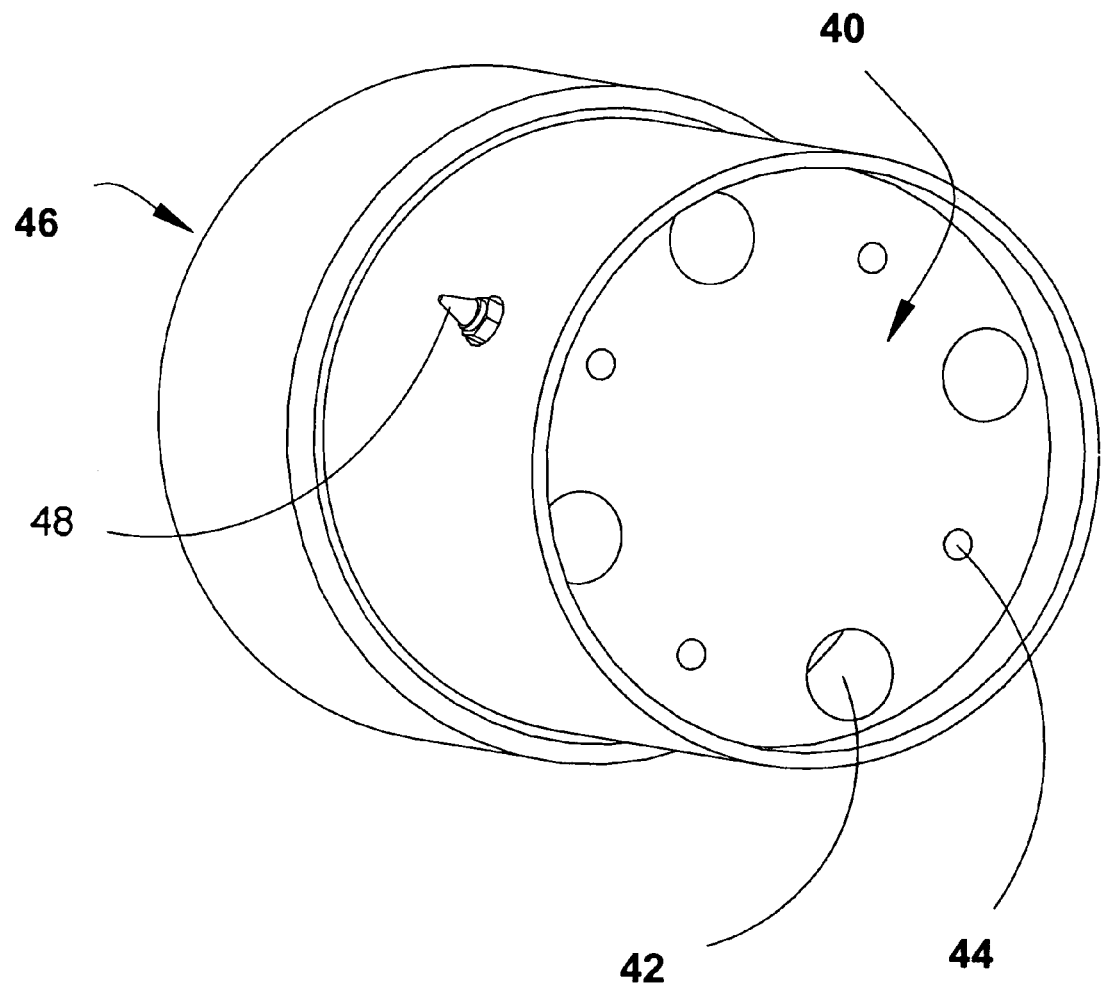
FIG. 2A is an illustration of a burner head showing an air intake.
Figure 2B:
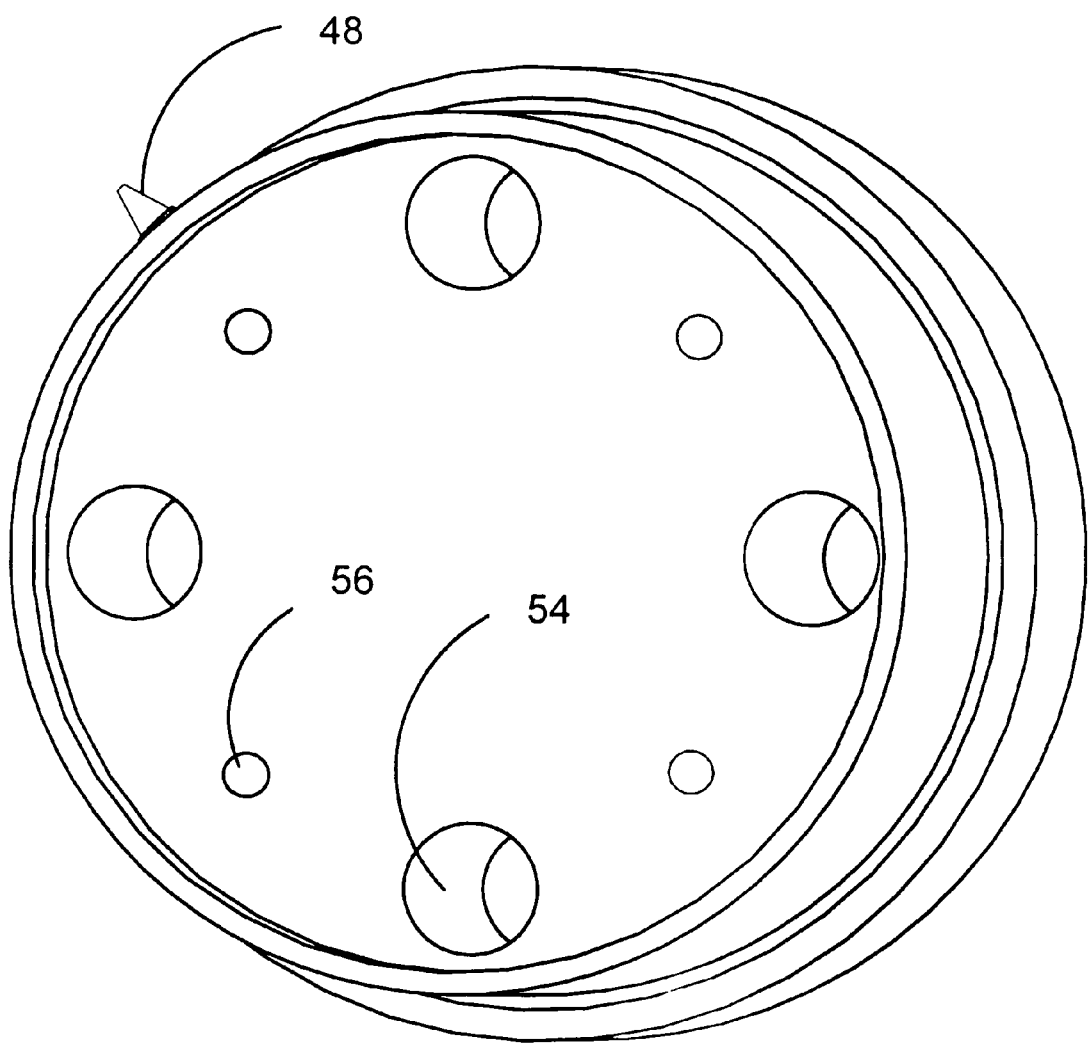
FIG. 2B is a view of a the burner head showing channels.
Figure 2C:
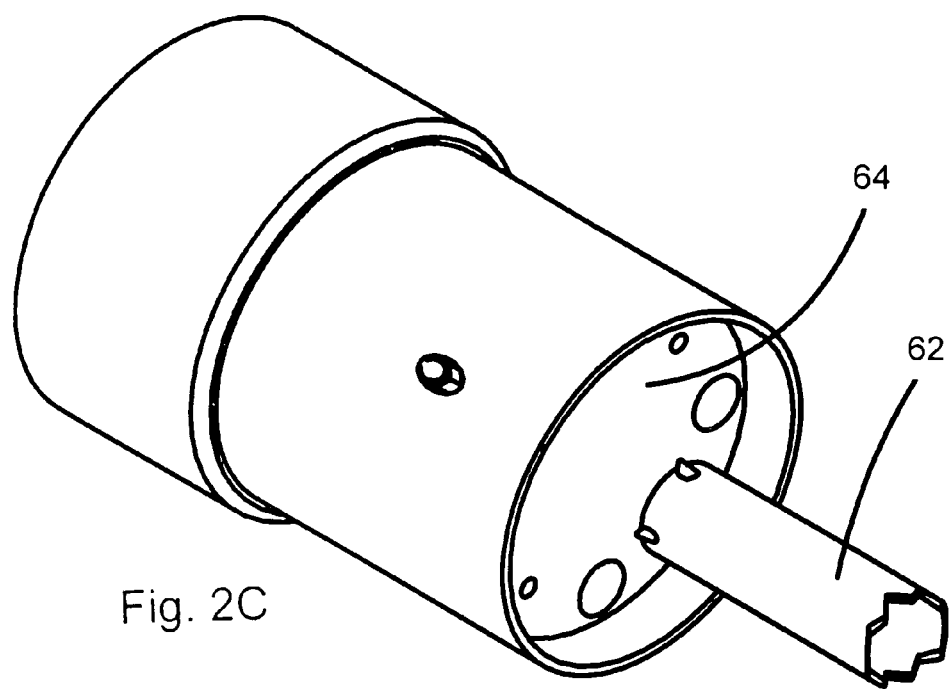
FIG. 2C is still another view of the burner head showing a gas conduit.
Figure 2D:
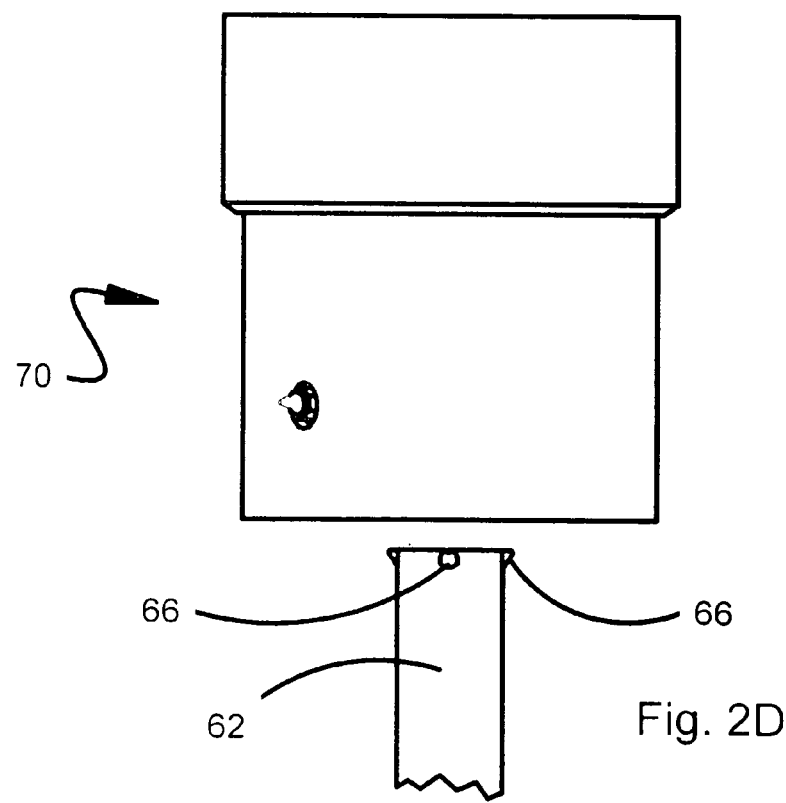
FIG. 2D is yet a further illustration of a burner head showing a gas conduit and nozzles.

A structure of an exemplary burner head of the invention is described schematically in FIGS. 2A to 2D, to which reference is now made. In FIG. 2A the burner head is shown in axonometric projection, and slanted with respect to its longitudinal aspect. Air intake 40 collects air and delivers air, and likewise, receives gas from the gas conduit (not shown) and delivers gas, to major channels such as channel 42 and to the minor channels such as channel 44. The length of the channels is typically 1 to 4 times the diameter thereof, to ensure some mixing but short of mixing sufficiently to support combustion inside the channels. Combustion takes place in a typically dome-shaped flame stabilization chamber 46. Spark plug 48 ignites the gas mixture in one of the minor channels 44. In some embodiments, more than one spark plug may ignite the gas in a corresponding number of minor channels. In FIG. 2B an isometric view of the burner head is shown at a slightly different angle. The major channel 54, and the minor channel 56 are shown on the face of the burner head, with the spark plug 48 protruding radially to the side. In FIG. 2C the burner head is illustrated in a schematic isometric view, showing a proximal portion, or upstream portion of the gas conduit 62 supplying gas into the air intake 64. In FIG. 2D the burner head 70 is shown as seen from a topside view, depicting the relationship between the burner head, the gas conduit 62, and the nozzles 66. A visual access port providing sight to the air distribution chamber 16 and to the burner head 22 may be provided, although not shown in the Figs.

Ignition of the Combustible Mixture

Figure 3A:
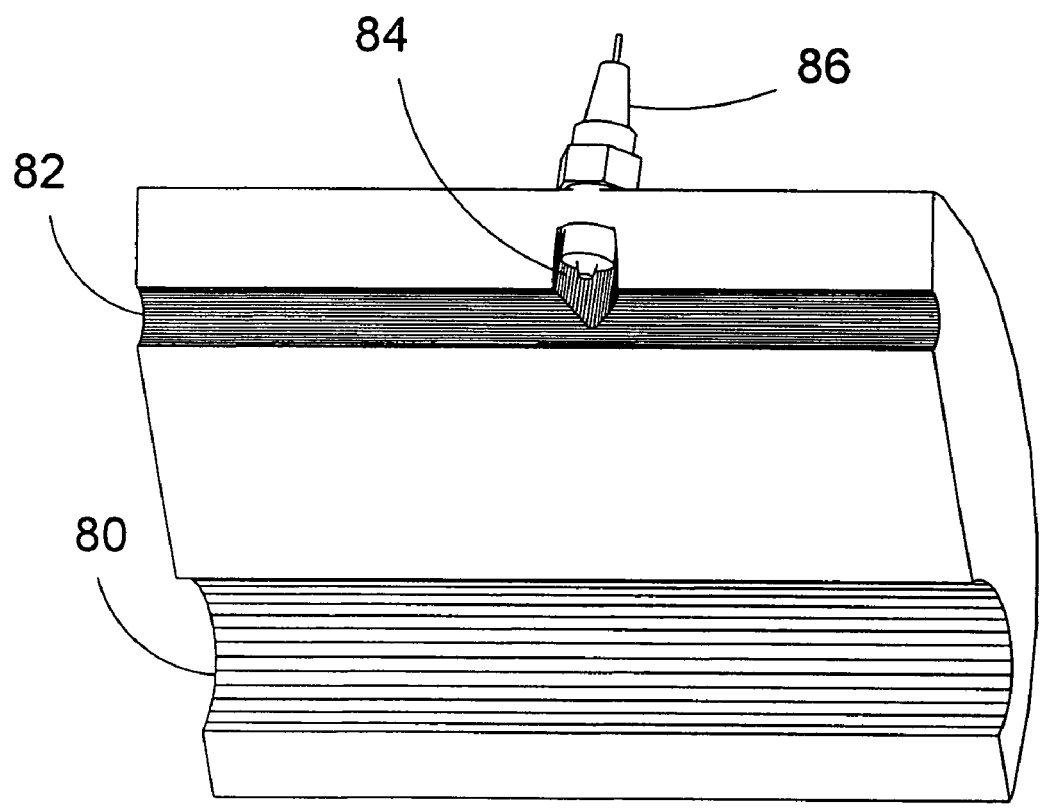
FIG. 3A is a longitudinal section through channels of a burner head with a spark plug.
Figure 3B:
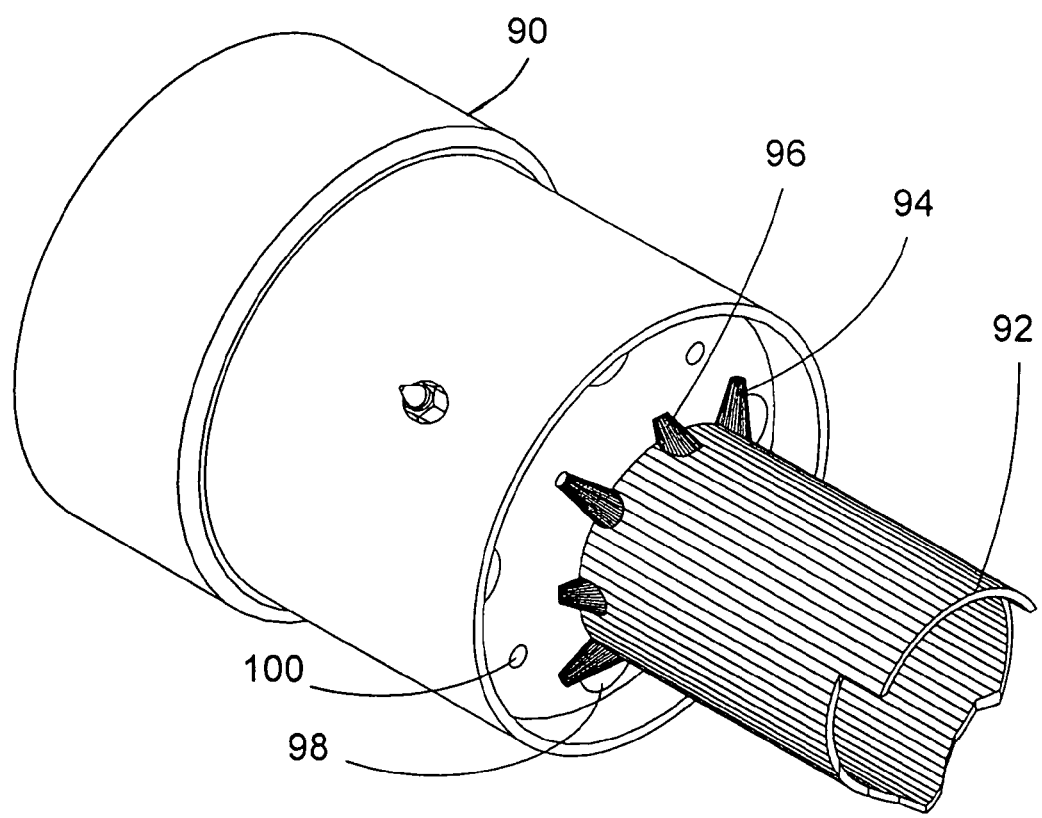
FIG. 3B depicts the distribution of nozzles.

Ignition of the gas mixture of gas with air is effected through a spark produced by a spark plug, which is associated with at least one of the minor channels of the burner head. The position of the spark plug in accordance with an embodiment of the present invention is described with reference to FIG. 3A. FIG. 3A shows a longitudinal sectional view made through a burner head of the invention. Major channel 80 conveys an inhomogeneous mixture of gas with air from the air intake into the flame stabilization chamber. Minor channel 82, which also conveys an inhomogeneous mixture of gas and air into the flame stabilization chamber, connects with an extension void 84 in which a spark plug 86 is disposed. The extension void permits a spark to occur in an environment with a gaseous mixture flow of reduced velocity. Moreover, to facilitate ignition, the gaseous mixture conveyed in the minor channel fitted with spark plug 86, may be supplied as a rich mixture. This can be achieved by selectively allocating a nozzle of appropriate dimensions and properties to convey a gas-rich mixture. Thus, even if the total amount of gas per unit time is low, the deployment of gas to nozzles can nevertheless keep a rich mixture of gas flowing in at least one channel. This feature is illustrated schematically with reference to FIG. 3B. Upstream to burner head 90 is attached gas conduit 92. Nozzles at the releasing end, or downstream end of the gas conduit, are either large such as nozzle 94, or small such as nozzle 96. Channels major and minor, such as, respectively, channel 98 and channel 100, are deployed correspondingly.

The spark plug being positioned at a remote distance and away from the flame stabilization chamber is not exposed to the elevated temperatures prevailing inside the flame stabilization chamber. Moreover, the ignited gas, generally starting at the spark plug, forms a trail extending downstream towards the flame stabilization chamber and with constant flow of mixed air/gas moving towards the flame stabilization chamber. Thereby, the spark plug is generally protected from the extreme high temperatures prevailing in the vicinity of the flame and is relatively cooled by the constant flow of fresh gas/air flowing towards it before being ignited. Furthermore, once combustion in the stabilization chamber has passed a transitional ignition phase and has stabilized, then the spark plug is switched off, whereby the ignition flame is also turned off, whereas the spark plug thus remains protected inside the extension void, and hidden away from heat. The system with a spark plug inside an extension void configured adjacent a minor channel fed with a gas-rich mixture creating free radicals for starting the reaction is another novel property of the instant invention. Combustion is initiated even though the spark plug is secluded and hidden remote at distance away from the flame stabilization chamber, thus protected from heat and damage, to provide an extended service life with enhanced reliability.

After the spark plug is switched off, the conditions in the minor channel, wherein a rich mixture flows, are insufficient for the support of a flame, even though a hot flame is entertained nearby in the flame stabilization chamber. It is the additional energy delivered by the discharge of the spark, produced by the spark plug that raises the energy level above the activation threshold, and initiates a flame, which is carried via the minor channel to the flame stabilization, or combustion chamber. The minor channel thus becomes an ignition flame operative for as long as the spark plug is energized, or activated. Hence it is important for the minor channel to have an extension void for providing favorable conditions for ignition when additional spark energy raises the total energy level above the activation point. The flame inside the ignition channel cannot be supported without the energy of the spark.

It was found that free radicals remain active for a relatively long time at low temperature, Life expectancies of the free radical were shown to last for as long as 300 ms in a propagation tube nearly 3 m long, with the gas temperature at the tube's exit close to that of room temperature.

Tests have proven that the diameter d of the minor channel should best selected as 1<d<7 mm, and that the length L of the minor channel should not exceed L=15 d. Typically, the dimensions d=4 and L<12 are a good choice.

Properties of the Gaseous Mixture

Figure 4:
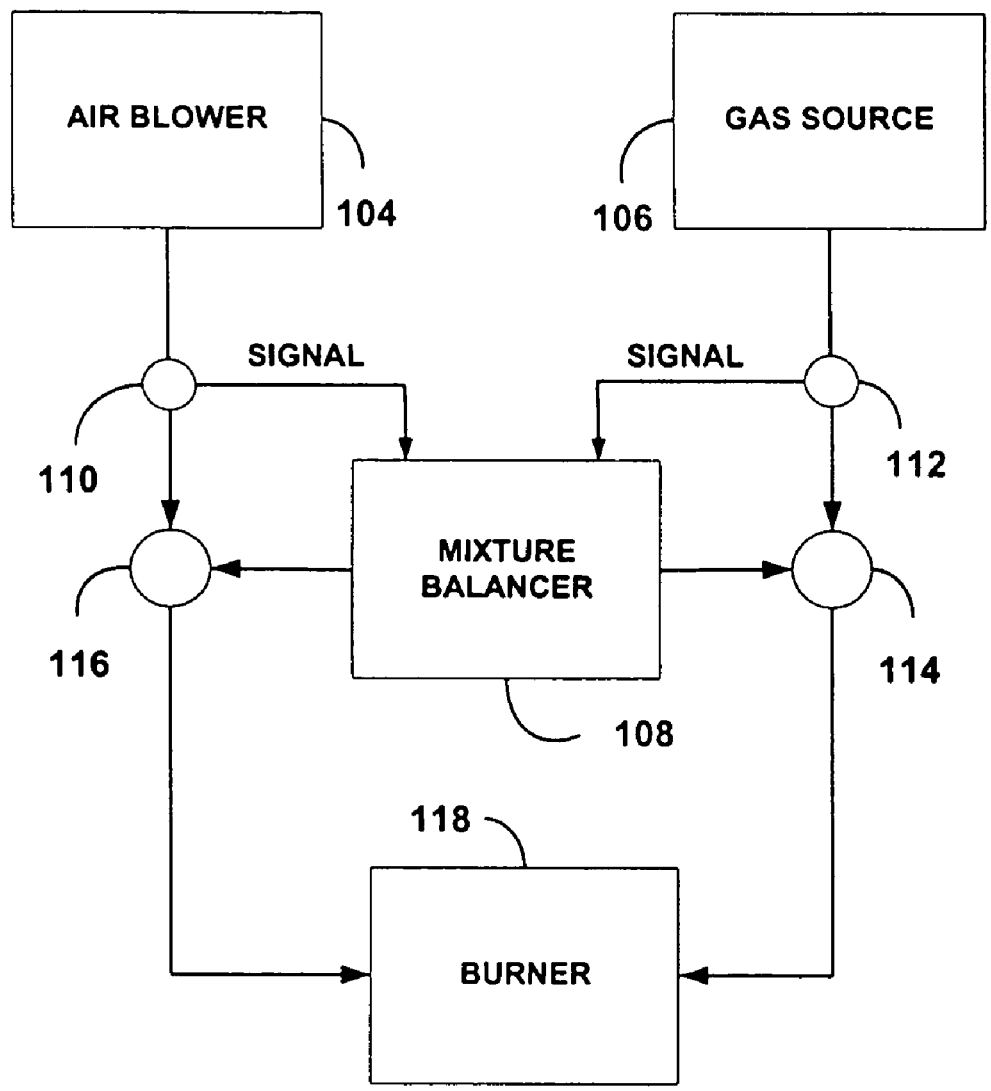
FIG. 4 is a block diagram of a balancing mechanism of the gas mixture in a burner of the invention.

The gaseous mixture flowing in the channels of the burner head is inhomogeneous. In such a situation, enclaves of air in combustible gas, and vice versa, enclaves of combustible gas in air, impede the creation of flash-back flame. A correlation between the rate of gas entering the gas conduit and the rate of air entering the receiving end of the burner head can be controlled in a preferred embodiment of the invention. This is described schematically in FIG. 4 to which reference is now made. Air blower 104 maintains a stream of forced air, and gas source 106 provides gas to the burner. Gas mixture balancer 108 receives a first indication 110, or first signal 110, of the rate of the air stream entering the air distribution chamber, and a second indication 112, or second signal 112, of the rate of gas flow from the gas source 106. The gas mixture balancer 108, sets a gas valve 114 to a certain aperture and/or changes the air blower rotation rate controller 116, to subsequently provide an overall gas to air ratio in burner 118 as required. The gas mixture balancer 108 takes in consideration several factors. For example the required overall hydrocarbon burning rate, and the type of hydrocarbon used (LPG, methane or else).

Figure 5:
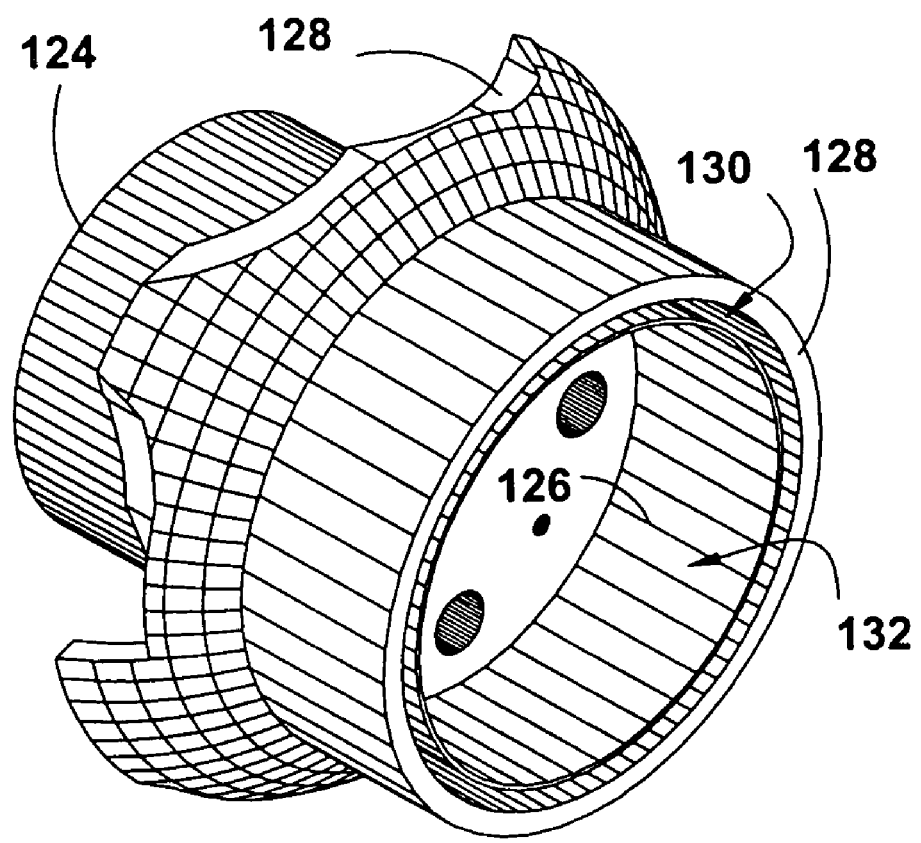
FIG. 5 is a schematic isometric illustration of the discharge end of the burner head, and an associated gas burner housing.

A flame stabilization chamber is formed downstream of the discharge end of the burner head, in which homogenization of the gas takes place. The homogenization is brought about by local turbulences occurring in situ, which promote an overall mixing of the components of the gases and of the combustion products. This homogenization counteracts the production of soot as all incompletely burnt volumes are repeatedly exposed to oxygen, to active free radicals, and to high temperatures evolved in neighboring volumes within the flame stabilization chamber. A secondary tubular air passage or an annular assembly of air channels is maintained in a location around the flame stabilization chamber as can be seen in FIG. 5 to which reference is now made. The receiving end 124 of the burner head, and the envelope of the flame distribution chamber 126 are contained within a burner housing 128. In the space 130 between the burner housing 128 and the envelope of the flame distribution chamber 126, air is pushed out encircling the hot core formed at the lumen 132 of the flame stabilization chamber.

Thus the mantle of secondary air supply limits the width of the flame, but lengthens the flame, and supplies oxygen to the peripheral volume of the flame. Lengthening of the flame prevents the formation of a short flame of intense heat, thus providing for better heat distribution over an extended range.

It will be appreciated by persons skilled in the art, that the present invention is not limited to what has been particularly shown and described hereinabove. For example, the burner is not only cylindrical but is possibly made in any shape that fits needs, Furthermore, the major channels and the minor channels vary in number and in cross-section, which is not necessarily circular. Moreover, the length of both the minor channels and the major channels is possibly lengthened if desired. Rather, the scope of the present invention is defined by the appended claims and includes both combinations and subcombinations of the various features described hereinabove as well as variations and modifications thereof which would occur to persons skilled in the art upon reading the foregoing description.

What is claimed is:

1. A method for burning ignitable gas mixed with air in a partially premixed gas burner for providing heat, comprising the steps of:

feeding a pressurized ignitable gas into an internal gas conduit terminating in a set of nozzles and feeding the pressurized ignitable gas from the set of nozzles with forced air from inside an air distribution chamber into minor and major channels at a receiving end of a burner head, conducting the ignitable gas and the air in the minor and major channels, wherein each of the minor and major channels extends longitudinally downstream through the burner head from the receiving end to a discharge end of the burner head, maintaining an inhomogeneous non-ignited mixture of the ignitable gas and the air in the minor and major channels while the ignitable gas and the air are conducted through the major and minor channels igniting a mixture of the ignitable gas and the forced air in at least one of the minor channels, and mixing the ignited mixture with the inhomogeneous mixture of non ignited ignitable gas in a flame stabilization chamber.

2. The method according to claim 1, further comprising the steps of:

creating a flame inside the flame stabilization chamber, providing an annular assembly of air channels completely surrounding the burner head and disposed around the flame stabilization chamber, and feeding forced air via the annular assembly of air channels provided around the burner head from the air distribution chamber into the flame stabilization chamber, to limit the width and increase the length of the flame, and to supply oxygen to the peripheral volume of the flame.

3. The method according to claims 1, wherein the step of igniting a mixture comprises the steps of:

allocating a nozzle of appropriate dimensions and properties at the receiving end of the burner head to convey a gas-rich mixture to the at least one minor channel having a void which is fitted with a spark plug, and forcing the gas rich mixture in the at least one minor channel to facilitate ignition.

4. The method according to claim 1, wherein the step of igniting a mixture comprises the steps of:

forcing a gas rich mixture in the at least one minor channel, installing at least one spark plug in an extension void disposed within the at least one minor channel but remote from the flame stabilization chamber, for igniting the gas rich mixture, maintaining conditions insufficient to support a flame in the at least one minor channel when the spark plug is switched off, activating the spark plug to ignite an ignition flame inside the at least one minor channel, with the ignition flame lasting for as long as the spark plug is activated, and using the ignition flame to ignite a flame in the flame stabilization chamber.

5. A system implementing a partially premixed gas burner for providing heat by burning ignitable gas mixed with air, comprising:

an air distribution chamber into an inside of which a forced air flow is fed, a cylindrical burner head having a length defined by a receiving end for accepting forced air and ignitable gas, and by a discharge end, a gas conduit for delivering ignitable gas into the receiving end of the cylindrical burner head, major and minor channels extending longitudinally downstream and running through the length of the burner head, wherein the ignitable gas is delivered from the gas conduit to the major and minor channels at the receiving end of the cylindrical burner head, at least one spark plug installed in an extension void disposed in at least one minor channel, for igniting a gas rich mixture of forced air and ignitable gas, and a flame stabilization chamber associated with the discharge end of the burner head.

6. The system according to claim 5 further comprising:

a gas rich mixture being forced in the at least one minor channel, and an ignition flame being created inside an extension void disposed inside the at least one minor channel for as long as the spark plug is activated, with the spark plug being installed remote from the flame stabilization chamber for igniting the gas rich mixture, whereby the flame inside the flame stabilization chamber is ignited by the ignition flame.

7. The system according to claim 5 further comprising:

a flame ignited inside the flame stabilization chamber, and annular air channels provided around the burner head for discharging a portion of the forced air flow into the flame stabilization chamber, whereby limited width and increased length of the flame is achieved.

8. The system according to claim 5 wherein:

an air intake is disposed at the receiving end of the burner head such that the air is are delivered to the major and minor channels at the receiving end of the burner head.

9. The system according to claim 5 wherein:

the flame stabilization chamber is substantially dome shaped.

10. The system according to claim 5, wherein the major and minor channels, the gas conduit and the air distribution chamber are arranged and dimensioned such that an inhomogeneous mixture of forced air and of gas runs through the major and the minor channels extending longitudinally downstream through the burner head.

11. The system according to claim 10, further comprising:

a gas rich mixture running in the at least one minor channel associated with and within which the spark plug is disposed.

12. The system according to claim 5, wherein the gas rich mixture conducted by the at least one minor channel is insufficient to support a flame, and a discharge of the spark plug is arranged and dimensioned to raise an energy level above an activation threshold to initiate a flame, the at least one minor channel having a diameter d defining the diameter of the at least one minor channel where d is in the range of: 1 mm<d<7 mm.

13. The system according to claim 12, wherein the at least one minor channel further comprises:

a length L defining the length of the at least one minor channel associated with the spark plug, where L is in the range of: L<15 d.

14. The system according to claim 12, wherein the at least one minor channel further comprises:

a diameter d in the range of: 3 mm<d<6 mm, and a length L in the range of: L<10d.

15. The method according to claim 2, wherein igniting the mixture further comprises the step of:

forcing a gas rich mixture in the at least one minor channel.

\* \* \* \* \*